Feb. 8, 1938.  P. G. EDWARDS  2,107,373
APPARATUS FOR CONVERTING CONTINUOUS MOTION INTO INTERRUPTED MOTION
Filed July 18, 1935   3 Sheets-Sheet 1 a. Ready to step to right.

b. Has just stepped to right.

c. Part way toward next step to right.

d. Ready to step to right.

e. Has just stepped to right.

f. Approaching condition 2a.

INVENTOR
P. G. Edwards
BY Jefferson Ehrlich
ATTORNEY

Feb. 8, 1938.  P. G. EDWARDS  2,107,373
APPARATUS FOR CONVERTING CONTINUOUS MOTION INTO INTERRUPTED MOTION
Filed July 18, 1935  3 Sheets—Sheet 3

INVENTOR
P. G. Edwards
BY Jefferson Ehrlich
ATTORNEY

Patented Feb. 8, 1938

2,107,373

UNITED STATES PATENT OFFICE 2,107,373

APPARATUS FOR CONVERTING CONTINUOUS MOTION INTO INTERRUPTED MOTION

Paul Griffith Edwards, Verona, N. J., assignor to American Telephone and Telegraph Company, a corporation of New York Application July 18, 1935, Serial No. 32,075

7 Claims. (Cl. 74—112)

This invention relates to arrangements for changing continuous motion into interrupted motion. More particularly, this invention relates to arrangements for converting continuous rotary motion into discontinuous rotary motion. Still more particularly, this invention relates to arrangements for the conversion of random rotary or oscillatory motion into motion which varies in finite and discrete steps.

When viewed from a different angle, this invention relates to arrangements for converting the motion of a device which continuously varies in accordance with, for example, the temperature of some device or apparatus or the resistance or gain of a circuit, into another motion which corresponds to the variable motion but will vary only in finite and discrete steps.

It is often desirable to take some function such as temperature, pressure, resistance, etc. which may be natural in character and may be of a continuously variable nature and change that function into interrupted derivatives, perhaps for the purpose of controlling some apparatus, circuit or equipment in accordance with the general characteristic of the function. This may be accomplished with the apparatus of this invention. In certain of the embodiments which will be described hereinafter, no external power may be required if the agency of continuous motion possesses sufficient driving force to cause the apparatus of this invention to operate properly. Where the continuous motion agency has insufficient driving force, in such case it may be used only as a trigger device for the invention, the driving force being supplied externally.

Figure 1A:
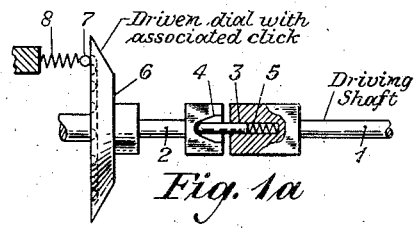
Figure 1B:
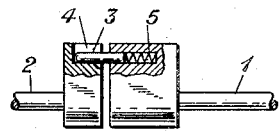
Figure 3A:
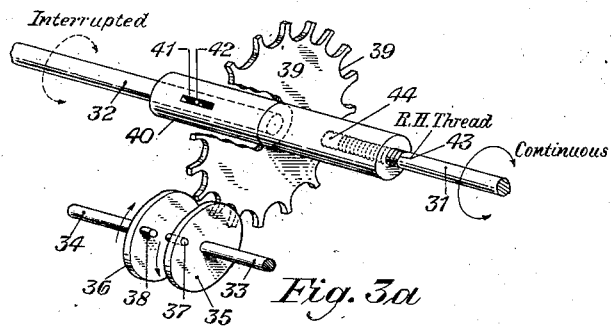
Figure 3B:
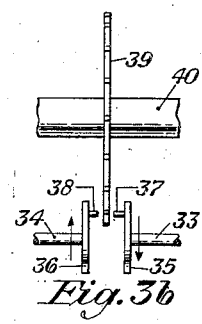
Figure 4:
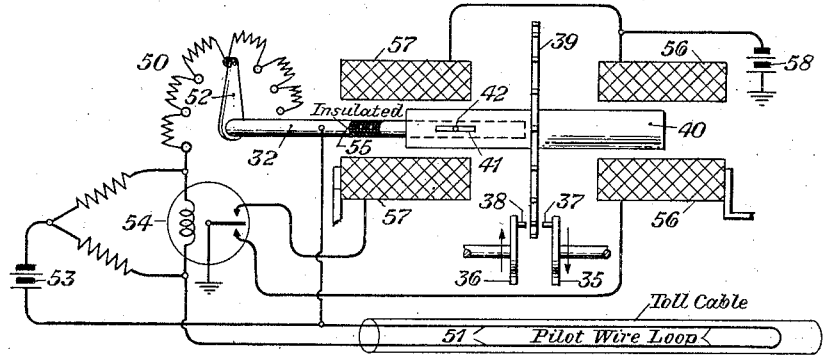
Figure 5:
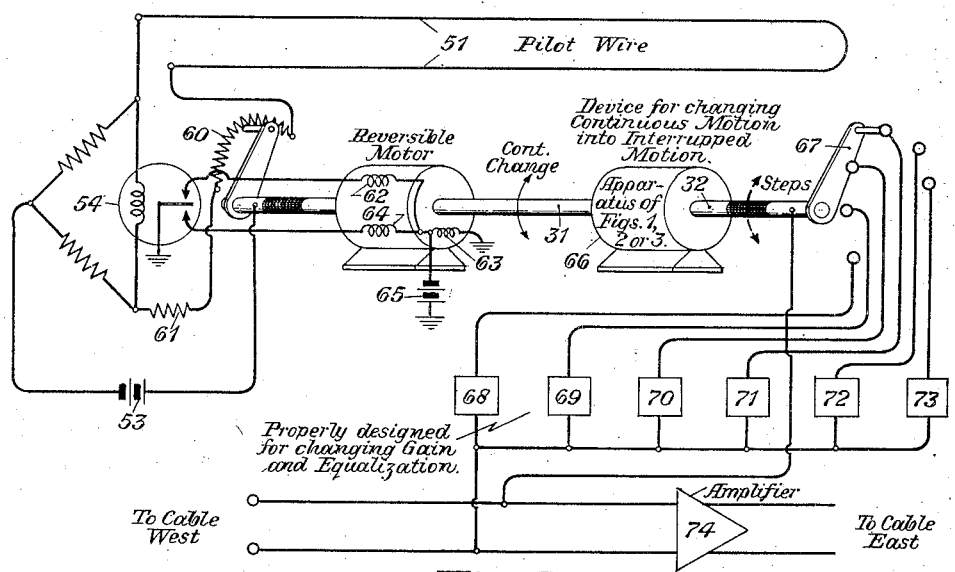

This invention will be better understood from the detailed description hereinafter following when read in connection with the accompanying drawings in which Figures 1a and 1b represent two views of one form of apparatus for converting continuous motion into a corresponding motion which is discontinuous; Fig. 2 represents a perspective of another arrangement for converting continuous motion into interrupted motion; Figs. 2a, 2b, 2c, 2d, 2e and 2f represent different views of the arrangement of Fig. 2; Figs. 3a and 3b represent still another embodiment of this invention and Figs. 4 and 5 represent still further embodiments and applications of this invention. Fig. 4 is shown partly in side view and partly in perspective.

Referring to Figs. 1a and 1b of the drawings, there are illustrated two views of parts of one arrangement for changing continuous motion, i. e. motion which may continuously change in direction, into interrupted motion, i. e. motion which corresponds in direction to the continuous motion but which varies in finite and discrete steps. The arrangement consists of a driving shaft 1 which may be assumed to rotate continuously in either direction according to some predetermined function with which it is associated, a function such as temperature change, humidity change, resistance change, etc. The shaft 1 may rotate in a clockwise direction through one or more revolutions or through part of a revolution as, for example, 150 degrees, or it may rotate in counter-clockwise direction through corresponding revolutions or any part of a revolution. From this agency, it is desired to cause another shaft 2, hereinafter called the driven shaft, to rotate in corresponding directions in discrete steps following generally the motion of the driving shaft 1. In Figs. 1a and 1b, this is accomplished by means of a mechanical linkage between the shafts 1 and 2, which consists of a sliding finger 3 associated with the shaft 1 but which at the same time rests in a slot 4 associated with the shaft 2. The finger 3 is held in contact with the inner surface of the slot 4 by means of a spring 5 which continuously applies pressure along the inner surface of slot 4. This applied pressure, when sufficiently great may cause the rotation of the shaft 2 in one or more discrete steps, as will be explained more fully hereinafter.

The shaft 2 may have associated with it a dial 6, the back or left-hand side of which may have a plurality of depressions uniform in depth and positioned circumferentially about the axis of the dial 6, the dial 6 being concentric with the shaft 2. Each of these depressions, shown somewhat schematically by dotted lines in the drawings, is deep enough to receive the ball of the click device 7 of a kind well known in the art. The ball of the click device 7 will generally remain in one of the various depressions for some finite time interval. It will be observed that the ball of the click device is retained in any one of the various depressions of the dial by a spring 8 which continuously applies pressure to the ball. In accordance with this arrangement, the shaft 2 and its associated concentric dial 6 have a tendency to remain in a fixed position until sufficient torque is applied to the shaft 2 to overcome the resisting effect of the spring 8 of the click device. When sufficient torque is so applied, the dial 6 and its shaft 2 will rotate through one or more steps in a direction corresponding to the rotation of the shaft 1 and the step or steps of rotation will be determined in general by the torque applied to the shaft 2. The ball of the click device 7 will come to rest in one of the depressions only when the torque of the shaft 2 is unable to overcome the resisting force of the spring 8.

Assume that the dial 6 is keyed to the shaft 2 and rests in one of its numerous possible positions and that the shaft 1 then starts to rotate from the position shown in the figure in either direction as, for example, in a clockwise direction when looking from the right hand side of the figure to the left. The finger 3 will also move in a clockwise direction but its left-hand end will ride on the inner surface of the slot 4, thereby applying pressure to the spring 5 at the right-hand end of the finger 3. As the spring 5 becomes compressed a gradually increasing torque will be exerted on the shaft 2 in a direction, i. e. clockwise, corresponding to the rotation of the shaft 1. The amount of pressure applied to the spring 5 will be determined, in part, by the shape of the slot 4 and it will be apparent that the developed torque will bear a predetermined relation to the angle of rotation of the shaft 1. A point will be reached where this developed torque is sufficient to overcome the resisting or retaining action of spring 8 of the click device 7. When this occurs, the dial 6 and the associated shaft 2 will be rotated in a direction corresponding to the rotation of the shaft 1, i. e. clockwise. The ball of the click device 7 will leave the depression in which it rested and will, in due course, assume a corresponding position in the next dial depression. Thus, the dial 6 and the shaft 2 will advance one step in the direction of rotation of the shaft 1. The finger 3 will be returned substantially to the bottom of the slot 4 and, moreover, the pressure of the spring 5 will then again be a minimum.

If the driving shaft 1 is further rotated in the same direction, a point may again be reached at which the left-hand end of the pin 3 will ride along the inner surface of the slot 4 and thereby apply a clockwise torque to the shaft 2 and dial 6 sufficient to overcome the retaining action of the spring 8 of the click device. Then, the ball of the click device will be allowed to move into another depression, and so on.

It will be also clear that the driving shaft may be moved or rotated in the opposite direction, i. e. counterclockwise, and when this occurs the finger 3 will ride along the opposite internal wall of the slotted device 4 and apply torque in a counter-clockwise direction to the shaft 2 and the dial 6. If this counter-clockwise torque is sufficiently great, the ball of the click device 7 will be moved out of the depression in which it rests and into another dial depression.

It will be apparent, therefore, that the driving shaft 1 may rotate in either direction through part of a revolution or through one or more revolutions and it will produce discontinuous rotation of the shaft 2 and the dial 6 in a corresponding direction, the latter rotation being in finite steps determined by the spacing of the circumferential depressions at the left-hand side of the dial 6 and by the click device 7. Thus, a continuous torque is converted into a discontinuous torque which may recur through several steps or continuously.

It will be clear that if the slotted member 4 is incorporated in a device so that the pin 3 is normally spaced at a greater or lesser distance from the driven shaft 2, the number of depressions traversed by the ball 7 of the click device will be changed. This is based on the assumption that the spacing and shape of the depressions in the dial 6 and the pressure of the spring 8 remains unchanged. In order that the modified arrangement operate properly, the shape of the slot 4, the distance of the pin 3 from the shafts 1 and 2 and the normal pressure of spring 5 must all be suitably proportioned.

In Figs. 2, 2a, 2b, 2c, 2d, 2e and 2f, a somewhat different arrangement for changing continuous motion into discontinuous motion is shown. The arrangement contemplates two racks 11 and 12, driving and driven racks, respectively. These may be two discs, driving and driven discs, respectively. In other words, the reference characters 11 and 12 may designate the driving and driven racks or the developed edges of these racks or the corresponding developed edges of discs laid out in a straight line. If discs or the like are employed, they may be concentrically arranged and spaced from each other by a small distance.

The rack 11 may be associated with some continuously changing function, such as temperature, pressure, resistance, gain or the like from which it is desired to impart to the rack 12 a corresponding motion but interrupted in finite steps. In order to accomplish this, there are associated with the racks 11 and 12 roller devices 13 and 14 which ride along the surfaces or edges of both driven and driving racks. These roller devices are held in contact with the teeth or edges of the racks by means of compression springs 15 and 16, respectively. One end of each spring is immovable but the other end will, in part, control the pressure applied to one or both of the roller devices.

A slot 17 may be associated with one of the racks, for instance, the driven rack, and a pin 18 may be associated with the other rack, for example, the driving rack. The pin 18 is actually fixed to the driving rack and it extends into the slot 17 of the driven rack so as always to remain between the two vertical (or radial) sides of the slot 17 or at times in contact with one of these sides. In other words, the pin 18 may move within the limits determined by the sides of the slots 17 and never beyond these limits. It will be shown hereinafter that the driven rack 12, which contains the slot 17, will be moved in one direction or another through one or more finite steps as the pin 18 of the driving rack 11 repeatedly comes in contact with one of the sides of the slot 17.

Figure 2A:
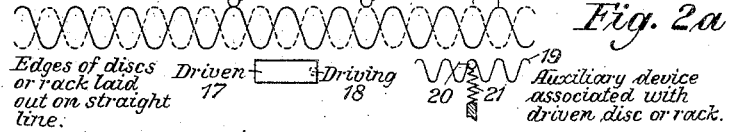
Figure 2B:
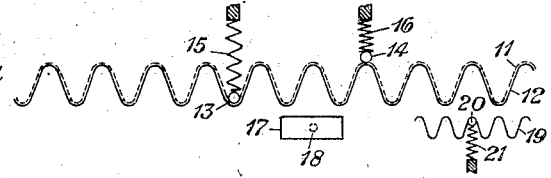
Figure 2C:
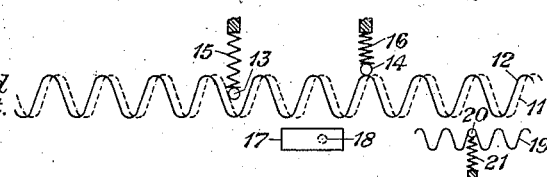
Figure 2D:
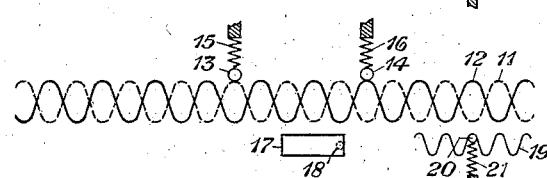
Figure 2E:
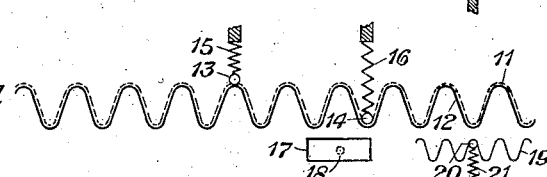
Figure 2F:
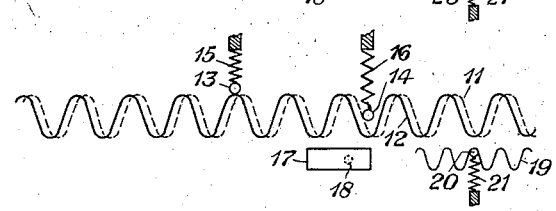
Figure 2:
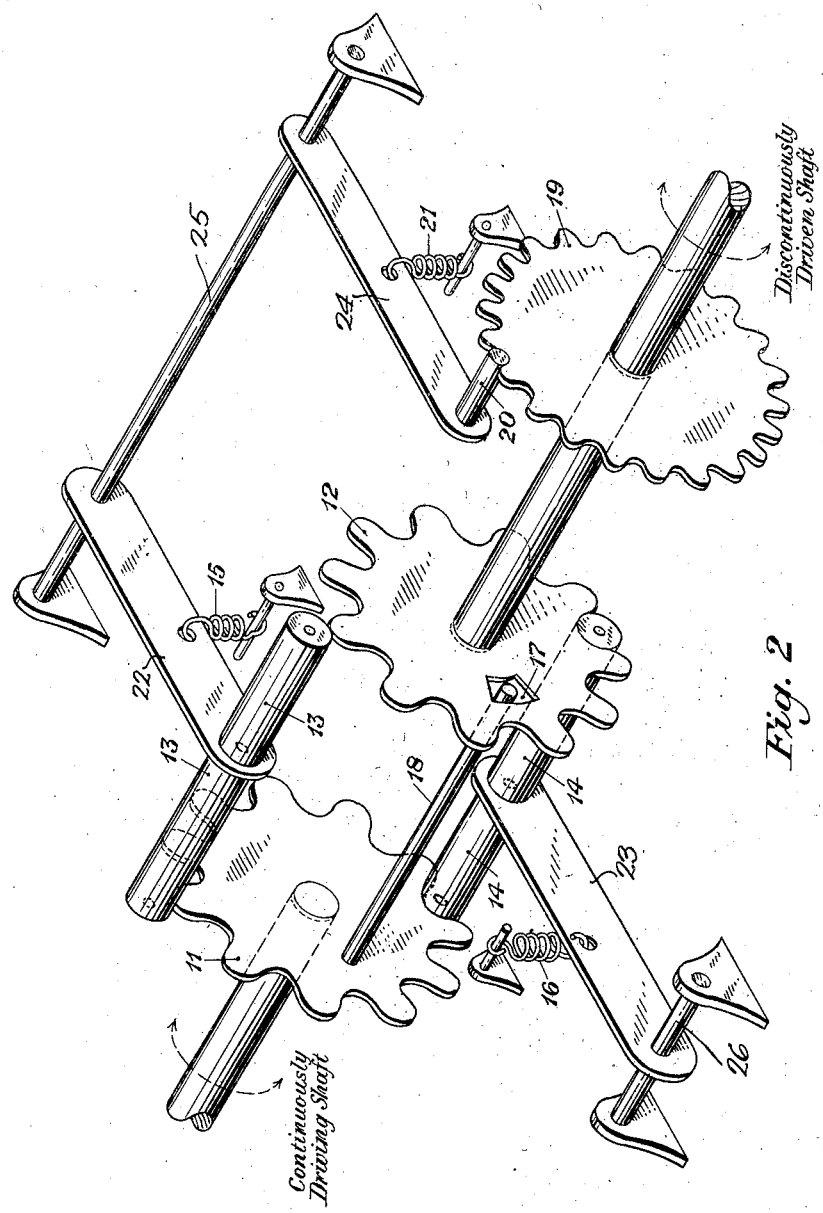

In all of the Figs. 2, 2a, 2b, 2c, 2d, 2e, and 2f, the driving rack 11 and the pin 18 are shown in dotted lines so as to be readily distinguishable from the driven rack 12 and the slot 17 of the driven rack. In Fig. 2b, for instance, the edges of the two racks are shown in the same relative positions but these edges are spaced by a small distance in the drawings merely for the purpose of again distinguishing one of these racks from the other.

Each of the rollers 13 and 14 may rest either on the peaks of teeth of the racks as shown in Fig. 2a, for instance, or in valleys between the two adjacent teeth, or one may rest on the peak of a tooth and the other in a valley as shown in Fig. 2b. When in any of these positions, the rollers 13 and 14 may be considered in stable equilibrium. When one of the rollers, for example, roller 13, is displaced from the peak of a tooth of the driven rack 12, as in Fig. 2c, it will cause this rack, i. e. the driven rack, to move in one direction or the other until this roller eventually reaches a valley between teeth and accordingly comes to rest in a state of equilibrium in that position for some finite time interval.

In Fig. 2a, the pin 18 of the driving rack has been brought into contact with the right-hand side of the slot 17 of the driven rack. The driven rack is therefore ready to step to the right. Immediately when this contact is established and somewhat earlier, the roller 14 rests on the peak of a tooth of the driving rack 11 while the roller 13 rests on a peak of a tooth of a driven rack 12. As soon as the driving rack 11 continues to advance to the right somewhat after the pin 18 contacts the right-hand side of slot 17, the pin 18 will cause the rack 12, which contains the slot, to move in a corresponding direction, namely, to the right. The roller 13 will then ride down the side of the tooth of the driven rack upon which it formerly rested until the roller reaches the valley between that tooth and the next adjacent tooth. This will advance the driven rack 12 to the right through a distance which corresponds to the width of one-half of a tooth so that the relative positions of the rollers 13 and 14 will then be as shown in Fig. 2b.

It will be noted that the racks are caused to move in one particular lateral direction, that is, to the right or to the left, while the rollers 13 and 14 move only in perpendicular directions. The maximum travel of either roller corresponds to the distance between the peak of a tooth and the valley between two teeth.

As the driving rack continues to advance to the right the roller 14 will remain upon the peak of the same tooth of the driven rack 12, but the roller 13 will be caused to ride up the side of the tooth of the driving rack 11. When the roller 13 is approximately half way up the side of the next tooth, the relative positions of the various parts will be as shown in Fig. 2c. It will be noted that the driving rack 11 has just left the roller 14 upon a tooth upon which it rested in the position shown in Fig. 2b and that the roller 13 has left the driven rack 12 in the valley in which it rested in the position shown in Fig. 2b.

When the driving rack 11 has moved to the right a distance sufficient to bring the roller 13 to the peak of the tooth with which it was associated in Fig. 2c, the roller 14 will then remain at rest upon the peak of a tooth of the driven rack. This is shown in Fig. 2d. The pin 18 will then be at or very close to the right side of the slot 17 of the driven rack 12. The arrangement of the parts as shown in Fig. 2d corresponds very closely to that shown in Fig. 2a except that the rollers 13 and 14 rest upon the peaks of teeth of the driving and driven racks, respectively, in Fig. 2d but in Fig. 2a these rollers rest upon teeth of the driven and driving racks, respectively.

As the driving rack 11 continues to move to the right, the driven rack 12 will be moved to the right through a distance which corresponds to the width of one-half of a tooth. The pin of the driving rack will then assume a position approximately midway between the sides of the slot 17 of the driven rack. At the same time the roller 14 will ride down the left side of the tooth upon which it formerly rested and assume a position in the valley between that tooth and the next adjacent tooth to the left. In this position the roller 14 will be in the valley between adjacent teeth of both the driving and driven racks. The roller 13 then assumes a position upon the peaks of corresponding teeth of both the driving and driven racks. This is the arrangement shown in Fig. 2e.

As the driving rack 11 continues to move to the right, the roller 14 will ride up the right side of the next adjacent tooth to the left, thereby leaving the driven rack 12. The roller 13 will remain upon the peak of a tooth of the driven rack where it was left by the driving rack 11 upon which it formerly rested. The relative positions of the pin 18 and the slot 17 as the roller 14 is half way up the side of the tooth upon which it is now riding are shown in Fig. 2f. Thereafter, further movement of the driving rack to the right will cause the rollers 13 and 14 to assume the positions shown in Fig. 2a.

In the foregoing description of Figs. 2a to 2f, inclusive, the driving rack 11 was described as moving to the right. It will be understood that the driving rack may equally well move to the left and the locations of the various parts will assume corresponding positions which will be apparent from the description already furnished. The driving rack 11 may at times remain stationary and during any such intervals the various parts will remain in their former positions and, of course, stationary.

The driven rack 12 is expected to move in finite steps in a direction corresponding to the continuous motion of the driving rack 11. In order to be sure that the driving rack will always operate in finite steps, a form of click device may be associated therewith. In Fig. 2a, the click device comprises a rack 19 having twice as many teeth as there are in the driven rack, a roller 20 and a spring 21. The rack 19 is directly coupled to the driven rack 12 in any well known manner. As the driven rack is moved in either direction through a distance which corresponds to the width of one-half of one of its teeth, the auxiliary click device will also be moved through a corresponding distance which in the case of the click device will represent the distance between two of its adjacent teeth. Thus the roller 20 will not be allowed to rest upon the peak of any of its teeth but will readily assume a position within the valley between adjacent teeth. The pressure of the spring 21 behind the roller 20 will assist in maintaining such a condition throughout the operation of the apparatus. This same auxiliary click device is shown in each of the other Figures 2b to 2f, inclusive, and as shown in this arrangement the roller 20 is always in the same position between the valley formed by two teeth.

The driving and driven members need not be racks as suggested by Figs. 2a to 2f, nor need they be laterally moving devices of any type whatever. These members may be rotatable devices such as gear wheels or notched devices, one form of which is shown, for illustrative purposes, in Fig. 2.

In Fig. 2 the driving and driven rotatable members 11 and 12, respectively, have toothed projections with which the cylindrical roller devices 13 and 14 are brought into contact in much the same manner as is illustrated in Figs. 2a to 2f. The cylindrical devices 13 and 14 are mounted in reciprocating elements or arms 22 and 23, respectively, as shown, these reciprocating elements 22 and 23 being rotatable about the immovable shafts 25 and 26, respectively. The elongated pin 18 is permanently fixed to the driving member 11 at one end, the other end of the pin 18 being freely movable between the sides of slots 17, formed in the driven member 12. The springs 15 and 16 maintain the devices 13 and 14, respectively, in contact with the toothed projections of the driving and driven members 11 and 12.

The toothed member 19 is fixedly coupled mechanically to the driven member 12. The member 19 forms part of the click device, referred to above with respect to Figs. 2a to 2f, and it has twice as many teeth as there are on members 11 and 12. The cylindrical device 20 is mounted in the reciprocating element or arm 24, which is also rotatable about the immovable shaft 25. The device 20 is maintained continuously in contact with the periphery of member 19 by virtue of the tension in the spring 21.

The continuous rotation of the member 11 will cause the normally free end of the pin 18 to contact one side of slot 17 intermittently, each such contact producing thereafter a partial rotation of the member 12 in a similar direction. The rotary motion of member 12 will cause the member 19 to rotate through a similar angle. The operation of the arrangement shown in Fig. 2 will correspond to that of the arrangement of Figs. 2a to 2f, already described hereinabove.

Figs. 3a and 3b show still another arrangement for converting continuous motion into interrupted motion, but in this arrangement power is supplied from an external source to operate the arrangement. The continuous motion of the driving shaft 31 is enabled to control the interrupted motion of the driven shaft 32. The external power is supplied from any available source to the shafts 33 and 34 which cause the wheels 35 and 36 which carry pins 37 and 38 to rotate in mutually opposite directions, as indicated by the arrows associated with these wheels. The wheel 35 may be considered to rotate in counter-clockwise direction and the wheel 36 in a clockwise direction.

A toothed wheel 39 is mounted on the shaft 40 which may be considered to couple the driving shaft 31 to the driven shaft 32. The shaft 40 has a narrow slot 41 within which a pin 42 mounted on the driven shaft 32 may slide. Thus the wheel 39, by virtue of its mounting upon shaft 40 and by virtue of the relationship of pin 42 and slot 41, will be enabled to slide along the driven shaft 32 but will have no free rotary motion with respect to the driven shaft 32. In other words, the wheel 39 will rotate the shaft 32 whenever the wheel rotates and the shaft 32 will remain stationary whenever the wheel 39 is stationary. It is possible, however, for the wheel 39 to slide along the shaft 32 within the limits defined by the slot 41 as will be pointed out hereinafter.

The driving shaft 31 is threaded at 43 as shown and for the sake of convenience of description, it may be assumed that this threading is that of a normal right-hand thread. The threaded shaft 31 engages the corresponding female threading 44 of the shaft 40. As the shaft 31 rotates, let us assume, in a clockwise direction, the engagement of its threads 43 with the corresponding threads 44 of the shaft 40 will cause the shaft 40 and the wheel 39 mounted thereon to move toward the driving shaft 31. As the shaft 31 is rotated in a counter clockwise direction, wheel 39 will be moved away from the driving shaft 31. It may be assumed that the threading of the members 43 and 44 is of course of steep pitch in order that only a small angular rotation of the shaft 31 will provide a large lateral movement of the wheel 39.

When the shaft 31 is moved, for example, in a clockwise direction, through an appreciable angular distance, the teeth of the wheel 39 will be brought into engagement with the pin 37 of the wheel 35. As the pin 37 continuously rotates in a counter-clockwise direction, it will strike one of the teeth of the wheel 39 and advance the wheel 39 in a clockwise direction through one step, that is a distance corresponding to the spacing between two of the teeth of wheel 39. As the wheel 39 is directly coupled to the driven shaft 32, the shaft 32 will also be driven in a clockwise direction through an angle corresponding to the rotation of the wheel 39.

After the wheel 39 has been rotated as already described, it will at the same time produce a relative motion of the shaft 40 with respect to the driving shaft 41 sufficient to cause the wheel 39 to clear the pin 37 of the wheel 35. However, if the driving shaft 31 continues to rotate in the same direction, that is, clockwise, the wheel 39 will soon again be rotated in a clockwise direction after it again strikes the pin 37 and this will again rotate the driven shaft 32 through a corresponding angle.

If the driving shaft 31 then rotates in the opposite or counter-clockwise direction, the wheel 39 will be moved away from the shaft 31 and it may later strike the pin 38 of the wheel 36 which is rotating in a clockwise direction. When this happens, the wheel 39 will be rotated in a counter-clockwise direction for an angular distance corresponding to the spacing between two of its teeth and it will carry the driven shaft 32 through a corresponding angle of rotation.

As shown in Fig. 3b, as long as the wheel 39 remains spaced from the contacts 37, 38, it will not be rotated in either direction and therefore the shaft 32 shown in Fig. 3a will remain stationary. The wheel 39 will be rotated only when it is moved laterally through a distance which will cause it to engage either of the pins 37 or 38.

The relation of the number of teeth included on wheel 39 to the pitch of the thread 43 may be such as to return wheel 39 midway between pins 37 and 38 or to any other desired position. In fact the steps may be sufficiently large as to return wheel 39 more than the distance between pins 37, 38, thus establishing a "hunting" condition of the device. In the latter case, if shaft 31 remained stationary the wheel 39 would move back and forth successively so that at the end of each movement it would engage pins 37 and 38.

Fig. 4 illustrates a modification of the arrangement shown in Figs. 3a and 3b. In this arrangement, it is proposed to change the resistances 50 step by step as the resistance of the pilot wire 51 of a toll cable changes in appreciable amounts.

The resistances 50 are connected as one arm of a Wheatstone bridge, this arm also including a rotatable arm 52 which is mounted on and electrically connected to the shaft 32. The other variable arm of the Wheatstone bridge includes the pilot wire 51. The battery or other source of direct current 53 is connected as one diagonal of the Wheatstone bridge. The other diagonal of the Wheatstone bridge includes the winding of a voltmeter relay 54 which may be of any well known type.

The toothed wheel 39 is mounted on the shaft 40 and, as in Figs. 3a and 3b, the shaft 40 is coupled to the shaft 32 by means of the slot 41 and the pin 42. The shafts 40 and 32, are, however, electrically insulated from each other at 55. Two solenoids 56 and 57 are mounted on opposite sides of the toothed wheel 39 and current may flow from a source or battery 58 through the windings of either of these solenoids. Upon the energization of either of these solenoids, the iron shaft 40 will be moved in the direction of the solenoid energized. Thus, when the solenoid 56 is energized, the toothed wheel 39 will engage the pin 37 of the continuously rotating wheel 35, or if the solenoid 57 is energized, the wheel 39 will engage the pin 38 of the wheel 36 which continuously rotates in the opposite direction.

When the Wheatstone bridge is substantially in balance, little or no current will flow through the winding of the voltmeter relay 54 and its armature will be spaced from the associated contacts. Under such conditions, the resistance of the pilot wire 51 may be equal to or bear a fixed relationship to the resistances 50 at the left of the movable arm 52.

When the pilot wire resistance changes as, for example, when it increases appreciably, the bridge will become unbalanced and the armature will be attracted to one of its contacts, for example, the lower contact. Current will then flow from the battery 58 through the windings of the solenoid 56 and over the armature and lower contact of the voltmeter relay 54. Upon the energization of the solenoid 56, the wheel 39 will be moved toward this solenoid and promptly one of the teeth of the wheel 39 will engage the pin 37, thereby rotating the wheel 39 in a clockwise direction when viewed from the right-hand side of the figure. The shaft 32 and the arm 52 will also be rotated through a corresponding angular distance in a clockwise direction and therefore, the resistances 50 will be increased by one step.

If the Wheatstone bridge then becomes balanced by the additional resistance at 50, the voltmeter relay 54 will become deenergized and its armature will then become spaced from its contacts. No current will then flow from the source 58 through the solenoid 56 and the wheel 39 will remain spaced from the pins 37 and 38.

Upon further unbalance of the Wheatstone bridge because of further increase of the resistance in the pilot wire 51, the bridge will then become unbalanced and current will again flow from the source 58 through the solenoid 56. The wheel 39 will again engage the pin 37 and thereby become rotated in a clockwise direction so as to further increase the resistance at 50. Thus, the resistance at 50 will be increased step by step until a balance is produced in the Wheatstone bridge.

When the unbalance of the Wheatstone bridge is due to an appreciable reduction in the resistance in the pilot wire 51, the armature of the voltmeter relay 54 will close its upper contact and current will then flow from the source 58 through the windings of the solenoid 57 and over the armature and upper contact of the relay 54. This will attract the wheel 39 and cause it to engage the pin 38 which will in turn rotate the wheel 39 in a counter-clockwise direction. Consequently, the arm 52 will be rotated so as to reduce the resistance at 50. Thus, as the pilot wire resistance becomes reduced, the apparatus will reduce the resistance at 50 step by step until the bridge becomes eventually balanced.

Obviously if the steps of resistance 50 are sufficiently large, voltmeter relay 54 will never remain in an uncontacted position and a "hunting" condition of the device will also obtain as described in connection with Figs. 3a and 3b.

Fig. 5 shows another arrangement to which this invention may be applied. The pilot wire 51 and the right-hand portion of the resistance 60 together form one arm of the Wheatstone bridge. The left-hand portion of the resistance 60 and an additional resistance 61 together form another arm of the bridge.

As the bridge becomes unbalanced, the relay 54 will cause its armature to close either of its associated contacts. Thus, as the resistance of the pilot wire increases, the upper contact of the relay 54 may be closed and as the pilot wire resistance decreases, the lower contact of that relay may be closed. The upper contact is in series with the field winding 62 of a reversible motor as well as with its armature winding 63. The lower contact of the relay 54 is in series with the field winding 64 as well as with the armature winding 63 of the motor. Thus the direction of rotation of the motor is controlled by the voltmeter relay 54. Current for energizing these windings is supplied by a battery or other source 65.

As the motor is rotated continuously in one direction or the other, it will rotate the shaft 31 which is coupled to another shaft 32 through a device 66 which may include any of the mechanical coupling devices shown in Figs. 1a and 1b or 2a to 2f, inclusive, or 3a and 3b. Thus, the apparatus 66 may include any device for converting continuous rotary motion into discontinuous rotary motion rotated or operated step by step.

The driven shaft 32 is coupled to but insulated from an arm 67 which may control the connection of any one of a plurality of impedances 68, 69, 70, 71, 72 or 73 across the input of amplifier 74 for controlling the gain, phase or frequency characteristic separately and collectively of the cable circuit to which this amplifier is connected. Thus, it will be seen that the step-by-step rotation of the shaft 32 will quickly connect across the input of the amplifier 74 any one of the equalizing pads 68 to 73, inclusive.

While this invention has been shown and described in certain particular arrangements merely for the purpose of illustration, it will be understood that the general principles of this invention may be applied to other and widely varied organizations without departing from the spirit of the invention and the scope of the appended claims.

What is claimed is:

1. The combination of a first toothed movable element, a second toothed movable element arranged so as to move in the same direction as said first element, means including a member movable substantially transversely with respect to the direction of motion of said movable elements for producing a lost motion coupling between said elements, means for moving the first element continuously, and means including said first named means and responsive to the motion of the first element for moving the second element in finite steps in the direction of motion of the first element.

2. The combination of two concentric rotatable elements, a normally untensioned pin movable in a direction concentric with respect to the direction of rotation of said rotatable elements, one end of said pin being supported by one of said elements, a slot in the other rotatable element, the other end of said pin being normally free from pressure and being normally positioned in spaced relation to both sides of said slot, means responsive to the rotation of the element supporting the pin for bringing the pin into contact with one of the sides of the slot, a click device for controlling the rotation of the rotatable element carrying the slot, and means responsive to the further rotation of the rotatable element supporting the pin for rotating the other rotatable element in finite steps determined by the click device.

3. The combination of a toothed rotatable element, grooved means rotatable step by step in response to the rotation of said element, and coupling means including a member periodically contacting the periphery of said element and movable in a direction which is substantially transverse with respect to the axis of rotation of said element and including means for periodically contacting said grooved means.

4. The combination of two movable elements, a normally untensioned pin mounted on one of said elements, the other of said elements having a slot within which the pin may move within predetermined limits, the pin being normally free from pressure and being normally spaced from both sides of the slot, means responsive to the motion of the element upon which the pin is mounted to move the pin periodically into contact with one of the sides of the slot, and means for moving the slotted element through steps of predetermined size as the pin periodically contacts one of the sides of the slot.

5. The combination of two mechanically coupled rotors having teeth along their periphery, a pair of rollers resiliently mounted about both of said rotors and movable only in directions substantially perpendicular to the axis of said rotors, and means responsive to the continuous rotation of one of said rotors to drive the other rotor step by step.

6. The combination of two toothed members mounted so as to be movable with respect to each other, two rollers movable under pressure over the teeth of both members in directions substantially perpendicular to the movements of said members, a pin fixedly mounted on one of said members and movable within a slot in the other member, and means controlled by said rollers for driving one of said members by finite steps as the other member moves its pin into contact with one side of the slot.

7. The combination of two coaxial toothed wheels, means including two rollers mounted at different points along the teeth of said toothed wheels so as to apply pressure to said toothed wheels substantially transversely with respect to the axis of said toothed wheels, means for continuously driving one of said toothed wheels, and means including a click device coupled mechanically to the other toothed wheel to rotate the latter toothed wheel through finite angular steps determined by the spacing of the teeth of said toothed wheels.

PAUL GRIFFITH EDWARDS.